Figures 6, 6A:
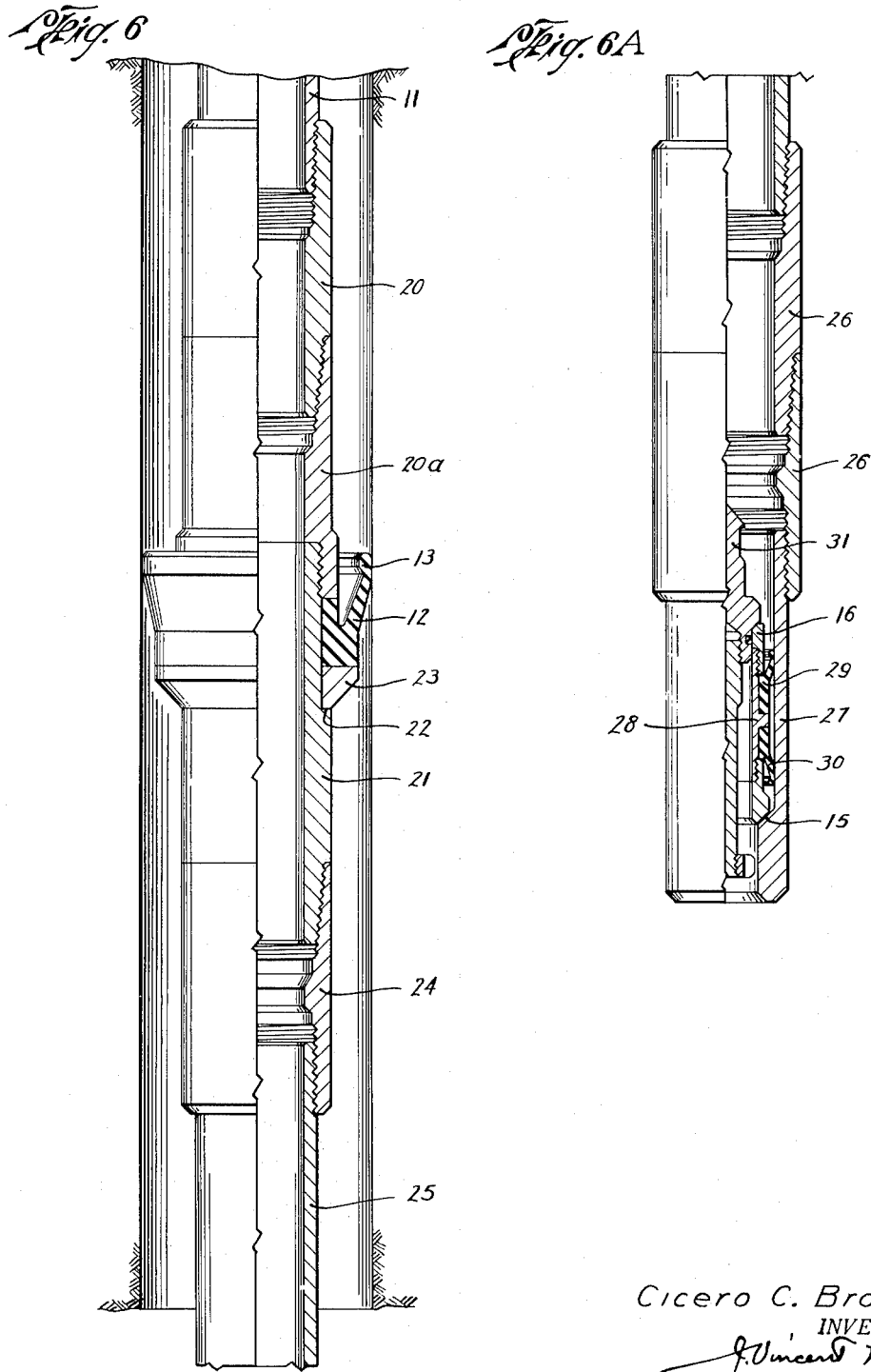

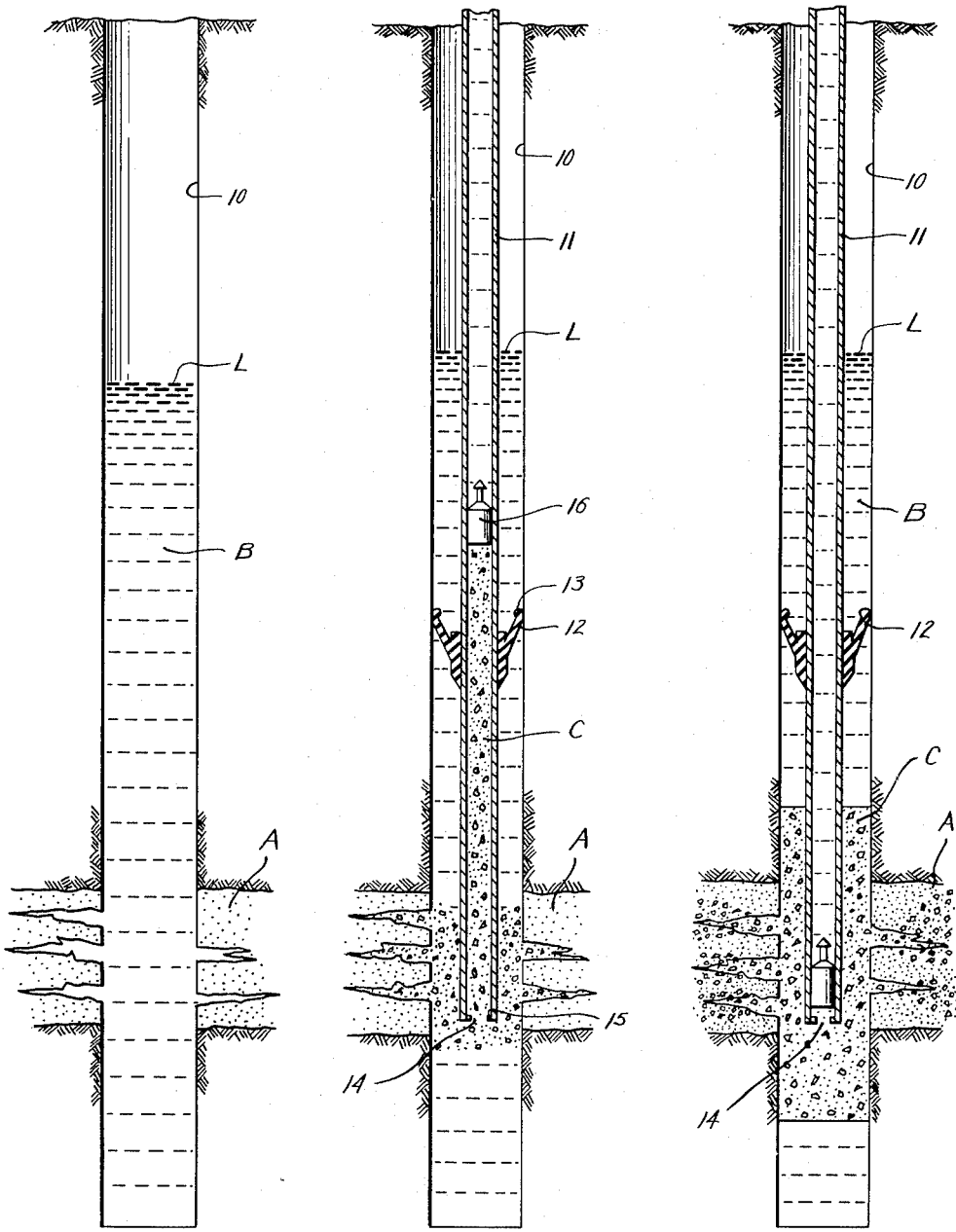

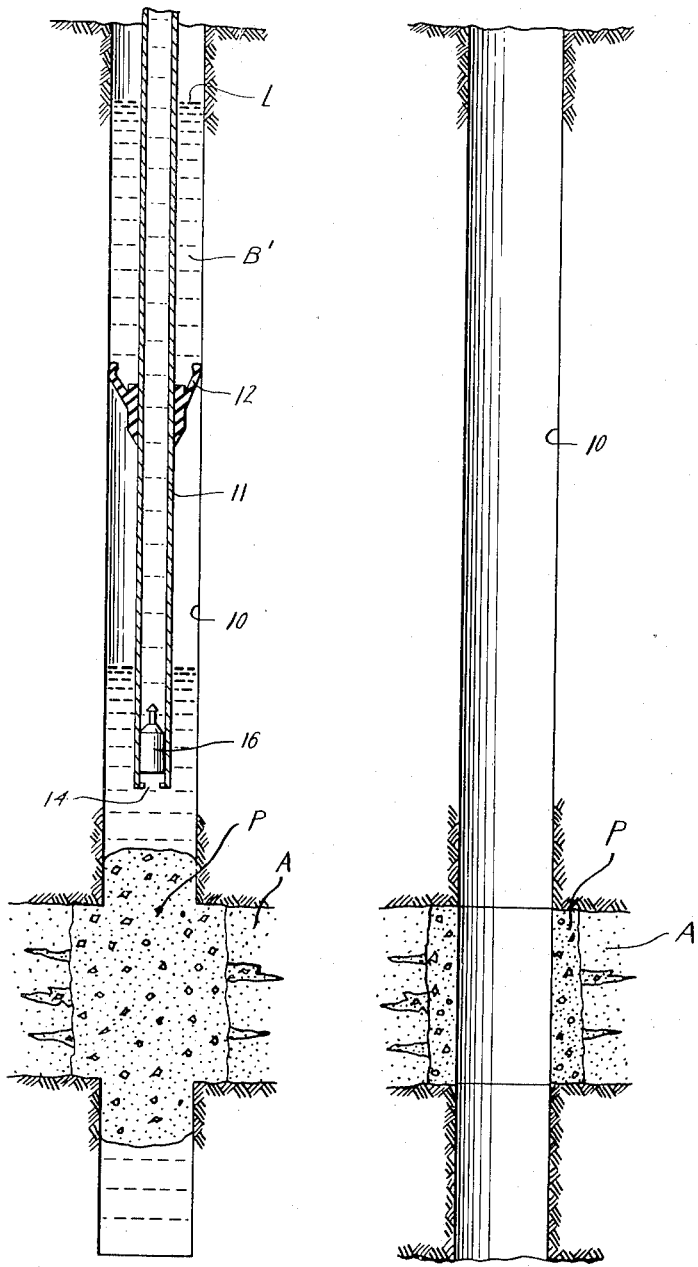

May 1, 1956 — C. C. BROWN — 2,743,779
METHOD OF CEMENTING WELLS
Filed April 28, 1951 — 3 Sheets-Sheet 3

Cicero C. Brown
INVENTOR.
BY J. Vincent Martin
and
Joe E. Edwards
ATTORNEYS ced May 1, 1956

2,743,779
METHOD OF CEMENTING WELLS

Cicero C. Brown, Houston, Tex.

Application April 28, 1951, Serial No. 223,630

8 Claims. (Cl. 166—21)

This invention relates to new and useful improvements in methods of cementing wells and relates particularly to a method of cementing off a selected sub-surface formation.

In the drilling of wells, it is not unusual to encounter a sub-surface formation, which because of its porosity or for other reasons, will receive or absorb the drilling fluid being circulated through the well bore during the drilling operation, with the result that circulation of the drilling fluid downwardly through the drill stem and upwardly through the well bore cannot be maintained. This condition is commonly referred to as "lost circulation" and is due to the fact that the drilling fluid being pumped into the well is entering the particular sub-surface formation as rapidly as it is being introduced. Ordinarily there is some pressure in the formation which is "taking" the fluid but such pressure is less than the pressure of the drilling fluid being circulated so that as long as pumping is continued the drilling fluid is forced into said formation. However, when the circulation of the fluid is halted, a pressure balance between the formation and the fluid in the well bore occurs, and this ordinarily results in a standing head or column of fluid within the bore, with the particular column or head being controlled solely by the pressure of the "thief" formation.

When a formation is encountered which causes the loss of circulation of the drilling fluid, it is necessary that further drilling be stopped until the particular formation can be sealed off. In some instances, a well casing is set to extend through the formation causing the difficulty and is thereafter cemented in place; this usually is effective but has the disadvantage of reducing the well bore diameter which may interfere with subsequent well operations. Attempts have been made to place a cement plug opposite the formation to thereby cement the formation in, after which the plug is drilled out but much difficulty has been experienced in obtaining a satisfactory plug.

It is, therefore, one object of this invention to provide an improved method of placing a cement plug within a well bore, whereby a sub-surface formation which has caused loss of circulation of the drilling fluid may be effectively sealed off from the well bore.

An important object of the invention is to provide an improved method of placing a cement plug within a well bore wherein the cement is introduced against the hydrostatic head pressure of the normal standing fluid column and thereafter a portion of such pressure is removed from the cement, whereby the formation pressure is utilized to consolidate the cement and thereby assure the production of an efficient cement plug within the bore.

Still another object is to provide a method wherein the cement is first forced from the well bore into the subsurface formation against the formation pressure and thereafter the pressure on said cement is relieved to an extent which allows the formation pressure to partially displace the cement back toward the bore to assure consolidation of the cement into a solid mass or body forming an effective plug.

Another object is to provide a method, of the character described, wherein the relief of pressure on the cement is accomplished by varying the hydrostatic head pressure acting upon the cement after its introduction, whereby accurate control of the pressure variation is maintained.

A further object is to provide an improved apparatus for forming an effective cement plug within a well bore opposite a sub-surface area which has previously caused loss of drilling fluid circulation.

Other objects will hereinafter appear.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a schematic view of a well bore illustrating the bore traversing a sub-surface formation which causes loss of circulation, Figure 2 is a similar view showing the cementing conductor and sealing means in position within the well bore during the pumping of cement into the bore, Figure 3 is a similar view illustrating the completion of the introduction of cement, Figure 4 is a view similar to Figures 1 to 3 showing the final step in the method and completion of the cement plug, Figure 5 is a similar view showing the cement plug drilled out, and Figures 6 and 6A are views partly in section and partly in elevation of the apparatus employed for carrying out the method.

In the drawings the numeral 10 designates a well bore which is shown as traversing a sub-surface formation or area A, the structure of which causes loss of circulation of the drilling fluid. As the well bore 10 is drilled through the formation A said formation is such that the drilling fluid enters the formation. As has been explained, this results in a loss of the circulation of the drilling fluid and circulation of said fluid cannot be maintained during a drilling operation. It is therefore necessary that the formation A be sealed off from the bore 10 before the drilling operation can proceed.

It is noted that the formation A usually has a certain pressure which is less than the pressure at which the drilling fluid was introduced into the well bore; however, when circulation is stopped and the drill stem (not shown) removed from the bore, a state of pressure balance or equilibrium is attained within the bore, with the result that a certain head of fluid will be present within the bore. The pressure exerted by the fluid column indicated at B in Figure 1 exactly balances the pressure of the sub-surface formation A with the result that the fluid column B will be maintained at the level L. Thus, Figure 1 illustrates the condition of the well bore prior to the carrying out of the present invention.

In practicing the improved method, a tubular conductor or pipe 11, which may be well tubing, is provided with an annular sealing element 12, and said sealing element is mounted a predetermined distance from the lower end of the conductor. The sealing element is formed with an upwardly directed annular sealing lip 13. The lower end of the conductor is open as indicated at 14, and an internal annular seat 15 is formed adjacent this open end.

The conductor 11 is adapted to be run into the well bore 10 as illustrated in Figure 2 so as to locate the lower end thereof adjacent or in close proximity to the formation A. The position of the sealing element 12 on the conductor is such with relation to the lower end of the conductor that said sealing element is disposed a predetermined distance below the level L of the fluid column B which is standing within the well bore. The particular selected position of the packing element 12 is in accordance with the particular pressure conditions within the formation A, as will hereinafter appear.

After the conductor 11 is in position, as shown in Figure 2, cement C is pumped downwardly through the conductor 11 in the usual manner and the cement emitting from the lower open end 14 of said conductor flows into the bore 10 and is forced into the crevices of the formation A. The usual follower plug 16 is disposed behind the cement and fluid is utilized to force all of the cement from the lower end of the conductor. When all of the cement has been introduced into the well bore the plug 16 engages the annular seat 15 in the lower end of the conductor (Figure 3) and at this time all of the cement has been displaced into the well bore and into the formation A. At this time the cement is subjected to the pressure applied to the plug 16 and also to the hydrostatic head pressure of the fluid column B. These combined pressures have functioned in cooperation with each other to displace the cement into the interstices and crevices of the formation A.

Because of the nature of the formation the displacement of the cement from the conductor 11 into the bore and thence into the formation A may not completely fill all of the open surface of the formation A which is exposed within the well bore; in fact, some of the cement may penetrate to a considerable depth within the formation, and if pressure conditions were held constant at this point the result might be long fingers of cement extending into the formation A.

For the purpose of consolidating the cement into a solid mass which will form an effective cement plug and will assure proper sealing off of the formation, the conductor 11 is lifted upwardly from the position shown in Figure 3 to the position shown in Figure 4 so that the lower end of the conductor will move upwardly out of the cement C which is within the well bore. This upward movement of the conductor not only removes said conductor from within the cement but also imparts an upward movement to the sealing element 12 whereby the fluid above said sealing element is raised. This fluid indicated at B' in Figure 4 is the upper portion of the initial column B, and of course the volume of fluid which the sealing element lifts is in accordance with the spacing of the sealing element below the liquid level L.

It will be evident that when the sealing element raises that portion B' of the liquid or fluid above said sealing element, the hydrostatic head pressure previously exerted by the entire column B is reduced. This reduction in pressure unbalances the pressure conditions across the cement C and allows the formation pressure to displace a portion of the cement back into the well bore 10. Obviously, the formation pressure working against the extended fingers of cement within the crevices of the formation will move the cement back toward the main body of the cement and will actually result in a consolidation of the cement to form a solid mass or body. It will be evident that the amount of partial displacement of the cement back into the bore is controlled in accordance with the reduction in the hydrostatic head pressure, and therefore, accurate control of the action is maintained through proper location of the sealing element 12 below the level L of the liquid column.

In most instances the reduction of the hydrostatic head pressure which allows the formation pressure to function in consolidating the cement to form a solid cement plug indicated at P in Figure 4 is sufficient to assure a proper plug. However, if desired the conductor could again be lowered to again inncrease hydrostatic head pressure and again force the cement out into the formation, after which the conductor may be again lifted to repeat the pressure reduction step. In this way, a reciprocating movement of the cement back and forth into the formation may be attained which will assure consolidation of the cementitious material to provide a solid cement plug. It is, of course, evident that when the section B' of the fluid column is lifted, another pressure balance or state of equilibrium will be reached between the formation pressure and the remainder of the fluid column and when this state of equilibrium is reached the pressures are maintained constant until the cement is set.

The plug formed in accordance with this method provides a solid cementitious body which completely and thoroughly seals off the "thief" formation A. Thereafter, the plug is drilled out as illustrated in Figure 5, and thereafter the drilling operation may continue.

The particular packing element 12, its construction and mounting are, of course, subject to variation, as is also the follow-up plug 16. However, in Figures 6 and 6A, a preferred assembly is illustrated wherein the conductor 11 has connection through coupling collars 20 and 20a with a mandrel 21. The mandrel is provided with an external shoulder 22 supporting a ring 23 on which the packing element 12 is mounted. The element is confined between the ring 23 and the lower end of the coupling 20a. The annular sealing lip 13 is upwardly directed so as to seal against downward flow past the element.

A coupling 24 connects the lower end of the mandrel with a tubing section 25 and the lower end of said section is coupled through collars 26 and 26a with a tubular sleeve 27. The sleeve has the internal annular seat 15 on which the plug 16 is adapted to seat.

The construction of the plug 16 includes a tubular body 28 having an upwardly directed sealing cup 29 and a downwardly directed sealing cup 30 mounted on its outer surface. A suitable fishing neck 31 extends upwardly from the plug.

By constructing the plug in the manner illustrated, the introduction of the cement C may be carried out in the manner heretofore described. After the cement plug P is set a suitable retrieving tool (not shown) may be lowered by means of a wire line and the follow-up plug 16 may be retrieved and removed from the conductor 11. Thereafter the conductor 11 may be utilized as a wash pipe to recondition the fluid within the well bore in preparation for the subsequent drilling operation.

It is pointed out that although the method has been described with the follow-up plug 16 employed, it is not necessary that said plug be used. When the follow-up plug 16 is omitted the cement is merely pumped downwardly through the conductor with the fluid being utilized to force the cement out of the conductor. After all of the cement has been introduced as shown in Figure 3, the conductor 11 is then raised to the position shown in Figure 4 and a constant pressure is held against the cement by maintaining a constant pressure of the fluid within the conductor. The pressure being exerted on the cement is varied by removing a portion of the fluid column which allows the formation to consolidate the cement in the manner heretofore described.

It has been found that the method set forth herein will effectively cement off the difficult type of formations which cause "lost circulation." Because of their inherent nature, these types of formations are very difficult to seal off by a cementing method because it is substantially impossible to completely fill all interstices, openings and crevices of said formation. With the present method the pressure unbalance is easily accomplished by merely removing a portion of the normal hydrostatic head pressure, and this allows the formation pressure to function in displacing portions of the cement back toward the well bore. It is evident that accurate control of the pressure reduction is possible because this pressure reduction is directly in proportion to the volume of fluid lifted from the original column, which in turn is dependent upon the spacing of the sealing element 12 below the level L of the column. Knowing the diameter of the well bore and the vertical area of the formation, the volume of cement to be introduced as well as the amount of pressure unbalance which is necessary to obtain a satisfactory plug may be readily determined.

In some instances, it might be desirable to drill out the plug 16 rather than retrieving the plug as has been heretofore described. It might also be desirable to make all of the parts below the coupling collar 24 in Figure 6, as well as the plug 16 of drillable material so that all of these sections may be drilled out. This would include the coupling 24, the pipe section 25, couplings 26 and 26a and the housing 27 in addition to the plug.

The foregoing disclosure and description of the invention is illustrative and explanatory thereof and various changes in the size, shape and materials, as well as in the details of the illustrated construction may be made, within the scope of the claims, without departing from the spirit of the invention.

I claim:

1. The method of forming a cement plug for sealing off a sub-surface formation within a well bore having a standing fluid column therein including, introducing cement into the well bore below the formation and directing said cement into the sub-surface formation surrounding the bore, then reducing the pressure of the standing fluid column on the cement by lifting a portion of the fluid column above the cement upwardly within the well bore to permit the formation pressure to partially displace the cement back toward the well bore to consolidate the cement into a solid plug, and thereafter maintaining the pressure conditions of the formation and the remainder of the fluid column in equilibrium and constant until the cement has set.

2. The method of sealing off a sub-surface formation as set forth in claim 1, together with the subsequent step of drilling out the cement plug to the diameter of the well bore.

3. The method of cementing off a sub-surface formation surrounding a well bore wherein a standing fluid column is present within the well bore above said formation, said method including, introducing cement into the well bore at a point substantially opposite the formation and into the fluid column, applying an auxiliary pressure plus the pressure of the fluid column to the cement to force it into the sub-surface formation against the formation pressure, thereafter reducing the hydrostatic head pressure of the fluid column acting on the cement by removing a portion of the normal hydrostatic head pressure while maintaining said auxiliary pressure substantially constant to reduce the pressure upon the cement to cause the formation pressure to partially displace the same back toward the well bore to form the cement into a consolidated mass, and then maintaining the pressure conditions of the formation and the remainder of the hydrostatic head pressure on the cement in equilibrium constant until said cement has set.

4. The method of cementing off a sub-surface formation surrounding a well bore wherein a standing fluid column is present within the well bore above said formation, said method including, introducing cement into the well bore at a point substantially opposite the formation and into the fluid column above the cement, applying an auxiliary pressure plus the pressure of the fluid column to the cement to force it into the sub-surface formation against the formation pressure, thereafter lifting a portion of the fluid column above the cement within the well bore to reduce the hydrostatic head pressure acting upon the cement to cause the formation pressure to partially displace the same back toward the well bore to form the cement into a consolidated mass, and then maintaining the pressure conditions of the formation and the remainder of the fluid column on the cement in equilibrium and constant until said cement has set.

5. The method as set forth in claim 4, together with the subsequent step of drilling out the cement plug so formed to the diameter of the well bore.

6. The method of forming a cement plug within a well bore opposite a sub-surface formation above which is a standing fluid column, said method including, lowering a conductor into the well bore with its outlet end adjacent the sub-surface formation, sealing off between the conductor and well bore at a point below the upper level of the fluid column whereby fluid is disposed above said seal, introducing cement under auxiliary pressure through the conductor and into the fluid column below the formation, whereby the cement is forced into the formation under said auxiliary pressure plus the hydrostatic head pressure, and thereafter reducing the hydrostatic head pressure by removing a portion of the normal hydrostatic head pressure to cause the formation pressure to partially displace the cement back toward the well bore to consolidate said cement into a solid mass.

7. The method of forming a cement plug within a well bore opposite a sub-surface formation above which is a standing fluid column, said method including, lowering a conductor into the well bore with its outlet end adjacent the sub-surface formation, sealing off between the conductor and well bore at a point below the upper level of the fluid column whereby fluid is disposed above said seal, introducing cement under auxiliary pressure through the conductor and into the fluid column below the formation, whereby the cement is forced into the formation under said auxiliary pressure plus the hydrostatic head pressure, thereafter raising the seal between the conductor and the well bore to lift the fluid above said seal and thereby reduce the hydrostatic head pressure acting on the cement to cause the formation pressure to partially displace the cement back toward the well bore and consolidate said cement into a solid mass.

8. The method as set forth in claim 7, together with the additional step of raising the conductor out of contact with the cement prior to the setting thereof.

References Cited in the file of this patent

UNITED STATES PATENTS

| | | |
|---|---|---|
| 46,860 | Moulton | Mar. 14, 1865 |
| 1,647,003 | Huber | Oct. 25, 1927 |
| 1,758,156 | Huber | May 13, 1930 |
| 2,079,517 | McQuiston | May 4, 1937 |
| 2,268,010 | Baum | Dec. 30, 1941 |
| 2,293,904 | Kail | Aug. 25, 1942 |
| 2,368,424 | Reistle | Jan. 30, 1945 |